(12) United States Patent
Sundström et al.

(10) Patent No.: US 10,995,279 B2
(45) Date of Patent: May 4, 2021

(54) PURIFICATION OF OIL

(71) Applicant: RECONDOIL SWEDEN AB, Östersund (SE)

(72) Inventors: Fred Sundström, Östersund (SE); Thomas Persson, Östersund (SE)

(73) Assignee: Recondoil Sweden AB, Östersund (SE)

( * ) Notice: Subject to any disclaimer, the term of this patent is extended or adjusted under 35 U.S.C. 154(b) by 0 days.

(21) Appl. No.: 16/608,033

(22) PCT Filed: Apr. 24, 2018

(86) PCT No.: PCT/SE2018/050417
§ 371 (c)(1),
(2) Date: Oct. 24, 2019

(87) PCT Pub. No.: WO2018/199839
PCT Pub. Date: Nov. 1, 2018

(65) Prior Publication Data
US 2020/0056102 A1    Feb. 20, 2020

(30) Foreign Application Priority Data

Apr. 28, 2017   (SE) .................................. 1750512-4

(51) Int. Cl.
*C10G 21/28* (2006.01)
*B01D 17/02* (2006.01)
(Continued)

(52) U.S. Cl.
CPC ......... *C10G 21/28* (2013.01); *B01D 17/0214* (2013.01); *B01D 21/10* (2013.01);
(Continued)

(58) Field of Classification Search
CPC ........ C10G 21/28; C10G 21/30; C10G 33/04; C10G 33/08; C10G 2300/208; B01D 17/0214; B01D 21/10; B01D 21/2488; B01D 21/32; B01D 21/009; B01D 21/30; B01D 17/047; B01D 17/12; B01D 17/0202; B01D 17/0208; B01D 21/02; C10M 175/0008; C10M 175/0016; C10M 175/005; G01N 33/28
See application file for complete search history.

(56) References Cited

U.S. PATENT DOCUMENTS

| 3,930,988 A | 1/1976 | Johnson |
| 2015/0152340 A1 | 6/2015 | Cherney et al. |

(Continued)

FOREIGN PATENT DOCUMENTS

| GB | 2 095 573 A | 10/1982 |
| GB | 2107347 A | 4/1983 |

(Continued)

*Primary Examiner* — Randy Boyer
*Assistant Examiner* — Juan C Valencia
(74) *Attorney, Agent, or Firm* — Dilworth & Barrese, LLP

(57) ABSTRACT

A method and a system for purification of contaminated oil. Said method comprises the steps of: —providing contaminated oil and a separation aid in a tank (3); —waiting for allowing a sludge phase comprising the separation aid together with impurities from the oil to settle in a bottom part (4) of the tank (3); —reusing the sludge phase for purification of new contaminated oil.

6 Claims, 2 Drawing Sheets

(51) Int. Cl.
  *B01D 21/02* (2006.01)
  *B01D 21/24* (2006.01)
  *B01D 21/32* (2006.01)
  *C10G 21/30* (2006.01)
  *C10G 33/04* (2006.01)
  *C10G 33/08* (2006.01)

(52) U.S. Cl.
  CPC ......... *B01D 21/2488* (2013.01); *B01D 21/32* (2013.01); *C10G 21/30* (2013.01); *C10G 33/04* (2013.01); *C10G 33/08* (2013.01); *C10G 2300/208* (2013.01)

(56) References Cited

U.S. PATENT DOCUMENTS

2016/0177198 A1* 6/2016 Mao ............... C10G 25/003
                                                   208/305
2017/0190985 A1* 7/2017 Matza ................ B01D 17/047

FOREIGN PATENT DOCUMENTS

| | | |
|---|---|---|
| GB | 2334034 A | 8/1999 |
| GB | 2405401 * | 3/2005 |
| WO | 95/14752 A1 | 6/1995 |
| WO | 2005/111181 A1 | 11/2005 |
| WO | 2016/095009 A1 | 6/2016 |
| ZA | 99817 B | 8/1999 |

* cited by examiner

PURIFICATION OF OIL

TECHNICAL FIELD OF THE INVENTION

The present invention relates to a method and a system for purification of oil.

BACKGROUND OF THE INVENTION

Purification of contaminated oils, such as for example mineral oil, industrial oils, processing oils or hydraulic oils, is important for the possibility to reuse the oils and therefore an important factor for the environmental future and the limited nature resources of oils. The contaminated oil can be purified, or recovered, by means of a liquid two-phase separation process, wherein a liquid separation aid is added to the oil and mixed therewith. Impurities will be captured by the separation aid and will accumulate in a bottom phase.

There is still a need to improve the purification process for contaminated oils.

SUMMARY

It is an object of the present invention to provide an improved method and system for the purification of contaminated oils.

This is achieved in a method and a system according to the independent claims.

Hereby the separation aid can be reused and surprisingly the purification effect when reusing the separation aid is the same or even better than with new separation aid. Furthermore, the reuse of the separation aid allows the use of a higher concentration of separation aid which will improve the separation effectivity. When reusing the separation aid a higher concentration of separation aid can be afforded to be used for each batch of contaminated oil to be purified.

According to one aspect of the invention a method is provided for purification of contaminated oil, said method comprising the steps of:
  providing contaminated oil and a separation aid in a tank;
  waiting for allowing a sludge phase comprising the separation aid together with impurities from the oil to settle in a bottom part of the tank;
  reusing the sludge phase for purification of new contaminated oil.

According to another aspect of the invention a system is provided for purification of contaminated oil. Said system comprises a tank, wherein said tank comprises:
  at least one inlet for providing contaminated oil and separation aid to the tank;
  at least one first outlet for taking out purified oil from the tank after separation;
  at least one second outlet for taking out sludge comprising the separation aid together with the impurities from the oil after separation;
  a mixer arranged in the tank for mixing newly added contaminated oil with old sludge.

In one embodiment of the invention the method further comprises the steps of:
  transferring clean oil out from the tank when the sludge phase has settled in the bottom part of the tank;
  adding new contaminated oil to the tank;
  mixing the newly added contaminated oil with the sludge phase previously settled in the bottom part of the tank;
  waiting for allowing a new sludge phase comprising the old sludge phase and new impurities from the new oil to settle in the bottom part of the tank.

In one embodiment of the invention the method further comprises the steps of:
  removing a part of the sludge settled in the bottom part of the tank before new contaminated oil is added to the tank; and
  compensating the amount of separation aid lost by the removing of a part of the sludge by adding to the tank an amount of fresh separation aid corresponding to the amount of removed separation aid.

In one embodiment of the invention the method further comprises the step of detecting the presence of an oil phase or a sludge phase in at least one position within the tank and according to the detection remove a certain amount of sludge before new contaminated oil is added to the tank.

In one embodiment of the invention the system further comprises:
  a sludge removing device connected to the at least one second outlet and arranged for removing sludge from the tank;
  a separation aid adding device connected to the at least one inlet and arranged for adding a separation aid to the tank;
  at least one content detection sensor arranged for detecting the presence of an oil phase or a sludge phase in at least one position within the tank; and
  a control device connected to said at least one content detection sensor and to said sludge removing device for controlling the sludge removing device to remove a certain amount of sludge but not all the sludge from the tank in dependence of the detection, said control device further being connected to the separation aid adding device and being arranged to control the separation aid adding device to add new separation aid in an amount corresponding to the amount of separation aid being removed from the tank in the removed sludge.

In one embodiment of the invention the system comprises at least two second outlets provided at different levels in a bottom part of the tank.

Hereby the user can chose which part of the sludge phase he wants to remove and which part he wants to keep in the tank for reuse. For example the lowermost bottom part of the sludge phase could be kept for reuse. Hereby a heavier fraction of the sludge phase can be kept in the tank for reuse and a lighter fraction of the sludge phase could be removed.

According to another aspect of the invention a computer program product is provided comprising instructions which, when executed in a processor in a control device in a system for purification of oil, cause the control device to perform the method as described above.

DETAILED DESCRIPTION OF EMBODIMENTS

Figure 1:
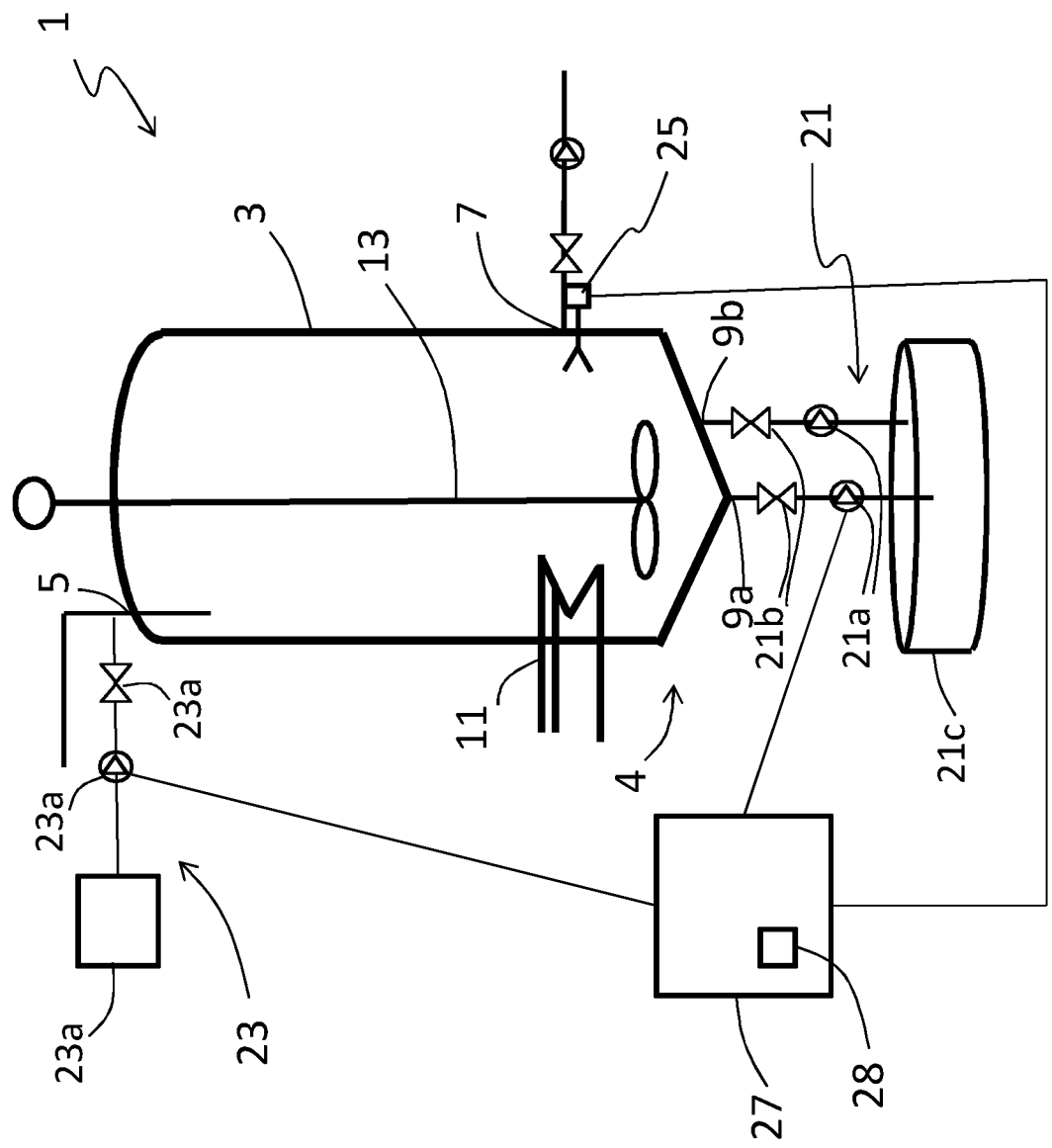
FIG. 1 shows schematically a system according to one embodiment of the invention.

FIG. 1 shows schematically a system 1 for purification of contaminated oil according to one embodiment of the invention. The contaminated oil to be purified in this system and by this method can be for example a mineral oil, industrial oils, processing oils, hydraulic oils, lubrication oils or paraffin oil. Said system 1 comprises at least one tank 3. The tank 3 comprises at least one inlet 5 for providing contaminated oil and separation aid to the tank 3.

The separation aid will by chemical interactions absorb contaminating solids, or dissolved impurities in the contaminated target oil. The separation aid should be liquid at the temperature at which the process is carried out. The separation aid composition should be substantially insoluble in the contaminated target oil, forming a two-phase mixture upon mixing with the contaminated oil. The liquid separation aid should also have a density different from that of the contaminated oil to be purified.

The separation aid is not soluble in the contaminated target oil because of its polar properties and thus colloids consisting of small droplets of the liquid separation aid composition are formed by the stirring, which through chemical interactions (hydrophilic, hydrophobic, and charge interactions) may absorb unwanted solid or the dissolved impurities in the contaminated target oil. In instances where the separation aid has a higher density than the oil the separation aid will at a gravity separation form a lower phase together with the solid and/or dissolved impurities. In instances where the separation aid has a lower density than the contaminated target oil, it will form an upper phase on gravity separation.

The liquid separation aid for use in the invention will generally be made up based on the following components: a) a polar polymer; b) a hydrotrope/solubilizer; and, c) a co-tenside.

Suitable separation aids with the properties described above, that can be used in the inventive process, may e.g. constitute a composition comprising a mixture of polar polymers such as polyethylene glycols, polypropylene glycols or similar polyalkylene glycols, organic surface active components with nonionic, anionic, cationic and amphoteric properties with the ability to enhance the solubility of solid or dissolved impurities in to the separation aid.

One example of a separation aid which can be used in this invention comprise: a) at least one polar polymer not soluble in oil and with a higher density than the oil, such as polyethylene glycol with an average molecular weight of 190-210 g/mole, e.g. Carbowax PEG 200 (Dow Chemical Company); b) at least one surface active hydrotrope/solubilizer, such as anionic sulfonic acids, phosphate ester-based substances or non-ionic surfactants from the poly-glycoside family, such as Simulsol SL 4, Simulsol SL 7 G and Simulsol AS 48 (Seppic, Air Liquide group); c) at least one amphoteric Co-surfactant, such as an propionate type e.g. Ampholak YJH-40 (Akzo Nobel) which is a sodium caprylimino dipropionate.

The separation aid will hereby capture impurities in the contaminated oil and form a phase together with the impurities called a sludge which will sink to a bottom part 4 of the tank 3. Hereby, by gravity settling two phases will be formed in the tank after some time, one oil phase and one sludge phase. Possibly the content in the tank can be warmed up for improving separation efficiency. In that case the tank is provided with a heating device 11 for example in the form of hot water tubes provided inside or outside the tank. The tank 3 comprises further at least one first outlet 7 for taking out purified oil from the tank 3 after separation and at least one second outlet 9a, 9b for taking out sludge comprising the separation aid together with the impurities from the oil after separation. In the embodiment shown in FIG. 1 one first outlet 7 and two second outlets 9a, 9b are provided. However other numbers of outlets can be provided in other embodiments covered by the invention. For example only one second outlet 9a can be provided instead of two and more than one first outlets 7 can be provided at different levels of the tank to enable outtake of oil phase from different levels. The at least one first outlet 7 is provided above the second outlets 9a, 9b. In the embodiment illustrated in FIG. 1 one second outlet 9a is provided at a lowest position of the bottom part 4 of the tank and another second outlet 9b is provided slightly above this level, i.e. at a level within the tank in between the level of the first outlet 7 and the other second outlet 9a. By providing one of the second outlets 9b at a level above the lowest position of the bottom part 4 of the tank 3 it is possible to keep the lowermost part of the sludge phase in the tank for reuse and remove a part of the sludge phase being provided above the lowermost part of the sludge phase. Keeping the lowermost part of the sludge phase for reuse could be suitable if for example the most effective separation aid would be provided there. By providing two or more second outlets 9a, 9b at different levels in the bottom part 4 of the tank 3 different parts of the sludge phase can be chosen to be removed. Hereby a heavier fraction of the sludge phase can be kept in the tank for reuse and a lighter fraction of the sludge phase could be removed.

Alternatively the outlets can be provided as suction pipes from the top of the tank, extending inside the tank but ending with an open end at different levels inside the tank.

According to the invention purified oil is taken out through the first outlet 7 and then new contaminated oil is added to the tank 3 through the inlet 5 for purification. The sludge phase or at least a part of the sludge phase from the previously purified oil is according to the invention reused for purifying the newly added contaminated oil. Suitably a part of the sludge phase is removed through one of the second outlets 9a, 9b before new contaminated oil is provided to the tank because otherwise the sludge phase will grow and finally become too big. The sludge phase comprises separation aid and impurities from the previously purified contaminated oil. When new contaminated oil is added to the tank a mixer 13 provided in the tank is used for mixing the newly added contaminated oil with the old sludge. It has been found that the separation aid in the sludge is still effective, or even more effective, for purifying contaminated oil. The increased efficiency of the separation aid with impurities could be explained by three mechanisms; (1) the surface properties of the separation aid is more prone to react and absorb more impurities, (2) the surface properties of the separation aid decreases the interfacial tension between the droplets and by that enhances the coalescence process and increases the droplet size, and (3) the weight of the impurities increases the density of the separation aid. Greater droplet diameter (d) and higher density ($\rho_p$) increases the settling velocity ($V_g$) according to Stoke's law (eq. 1) and makes the separation process faster and more effective. A new sludge phase will form and sediment to the bottom of the tank 3.

$$V_g = d^2(\eta_p - \eta_l)/18\eta g \qquad \text{eq 1}$$

$V_g$=gravitational settling velocity (m/s)
d=particle diameter (m)
$\Sigma_p$=particle/droplet density (kg/m3)
$\rho l$=liquid phase density (kg/m$^3$)
$\eta$=liquid phase viscosity (kg/ms)
g=gravitational acceleration (m/s$^2$)

The system 1 comprises further a sludge removing device 21 connected to the at least one second outlet 9a, 9b and arranged for removing sludge from the tank 3. The sludge removing device 21 can comprise a sludge storage tank 21c connected to the at least one second outlets 9a, 9b through one or more pumps 21a and possibly also one or more valves 21b. The system 1 also comprises a separation aid adding device 23 connected to the inlet 5 and arranged for adding a separation aid to the tank 3. The separation aid adding device 23 comprises in one embodiment a pump 23a, possibly a valve 23b and a separation aid tank 23c. Furthermore, according to one embodiment of the invention the system 1 comprises at least one content detection sensor 25 arranged for detecting the presence of an oil phase or a sludge phase in at least one position in the tank 3. The content detection sensor 25 could for example be a guided wave radar, which is a long wire attached to the top of the tank, hanging inside the tank almost all the way down to the bottom of the tank. Such a guided wave radar can provide information about where an interface between two phases are located by comparing reflected microwave pulses which will differ when the wire is provided in different environments. In another embodiment however one or more content detection sensors are provided at different levels within the tank. The content detection sensors 25 can be sensors measuring for example dielectric properties or densities of the content in the tank. One example of a sensor which can be used is a sensor measuring density differences for example via a vibrating fork or Coriolis measurements. Another example of a sensor is a sensor measuring dielectric properties of the content. Such a sensor can be based on capacitive or microwave measurement technology or based on impedance spectroscopy. An advantage with this type of sensor is that it is a very stable type of sensor which is not affected by the environment. For example if impurities from the oil will be attached to the sensor the output from the sensor will not be affected as would be the case with many other types of sensors.

In one embodiment of the invention one content detection sensor 25 is provided at a specific level in the tank, for example right below or close to the level of the first outlet 7 as shown in the embodiment of FIG. 1. If the sensor 25 output according to predefined comparing values indicates that sludge is present at the level of the sensor 25, sludge needs to be removed from the tank through one of the second outlets 9a, 9b before purified oil can be transferred from the tank 3 through the first outlet 7. Sludge need to be removed from the tank at least until the sensor 25 output changes, i.e. indicating oil phase at the level of the sensor, before purified oil can be transferred from the tank 3 through the first outlet 7. According to the invention some sludge is kept in the tank for reuse in a next purification cycle. The content detection sensor 25 can in another embodiment be provided at a different level between the first outlet 7 and the second outlet 9 or alternatively a number of content detection sensors 25 could be provided along the inside wall of the tank at different levels. For example one sludge reference sensor can be provided at the bottom of the tank and one purified oil reference sensor can be provided at a higher level in the tank. In between these two reference sensors one or more content detection sensors are provided.

Furthermore the system 1 comprises a control device 27 connected to said at least one content detection sensor 25 and to said sludge removing device 21 for controlling the sludge removing device 21 to remove a certain amount of sludge but not all the sludge from the tank in dependence of sensor 25 output. Said control device 27 is further connected to the separation aid adding device 23 and is configured to control the separation aid adding device 23 to add new separation aid in an amount corresponding to the amount of separation aid being removed from the tank in the removed sludge.

Figure 2:
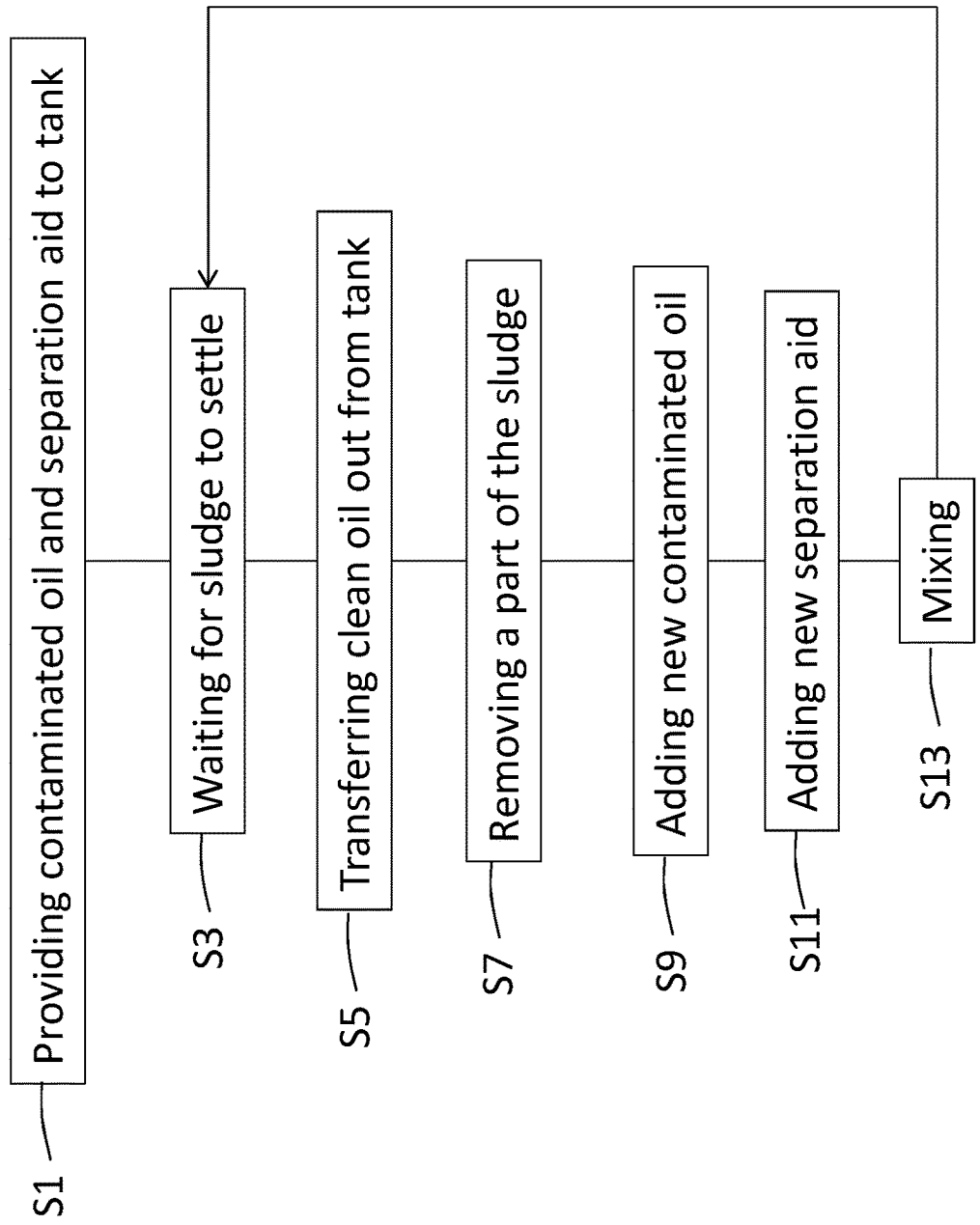
FIG. 2 is a flow chart of a method according to one embodiment of the invention.

FIG. 2 is a flow chart of a method for purification of contaminated oil according to one embodiment of the invention. The method steps are described in order below:

S1: Providing contaminated oil and a separation aid in a tank 3.

S3: Waiting and possibly warming the tank for allowing a sludge phase comprising the separation aid together with impurities from the contaminated oil to settle in the bottom part 4 of the tank 3.

S5: Transferring clean oil out from the tank when the sludge phase has settled in the bottom of the tank.

S7: Removing a part of the sludge settled in the bottom of the tank.

S9: Adding new contaminated oil to the tank.

S11: Adding new separation aid in an amount to compensate for the separation aid lost by the removing of a part of the sludge.

S13: Mixing the newly added contaminated oil with the sludge phase previously settled in the bottom of the tank.

After this step the process is returned to step S3, i.e. waiting for allowing a new sludge phase comprising the old sludge phase and new impurities from the new contaminated oil to settle in the bottom of the tank.

An optional step in the process is to detect the presence of an oil phase or a sludge phase in at least one position within the tank. This detection can be provided by use of content detection sensors in the tank as described above. According to the detection a certain amount of sludge can be removed before new contaminated oil is added to the tank.

Even though not shown and described in detail the control device 27 of the system 1 can also be connected to a pump for providing new contaminated oil to the tank 3 and to a pump for transferring the purified oil out from the tank 3. The control device 27 can also possibly be connected to the mixer 13 and the heating device 11 if such a heating device 11 is provided in the system 1.

A computer program product can also be provided. Said computer program comprises instructions which, when executed in a processor 28 in the control device 27 in the system 1 for purification of oil, cause the control device 27 to control the flows in the system as described above. The computer program comprises instructions, which when executed in the processor 28 in the control device 27, cause the control device to perform the method as described above in relation to FIG. 2.

The invention claimed is:

1. A method for purification of contaminated oil, comprising the steps of:
   providing contaminated oil and a separation aid in a tank (3);
   waiting for allowing a sludge phase comprising the separation aid together with impurities from the oil to settle in a bottom part (4) of the tank (3); and
   reusing the sludge phase for purification of new contaminated oil by mixing the sludge phase with the new contaminated oil.

2. A method according to claim 1, further comprising the steps of:
   transferring clean oil out from the tank when the sludge phase has settled in the bottom part (4) of the tank (3);
   adding new contaminated oil to the tank;
   mixing the newly added contaminated oil with the sludge phase previously settled in the bottom part of the tank; and
   waiting for allowing a new sludge phase comprising the old sludge phase and new impurities from the new oil to settle in the bottom part of the tank.

3. A method according to claim 2, further comprising the steps of:

removing a part of the sludge settled in the bottom part (4) of the tank (3) before new contaminated oil is added to the tank; and compensating the amount of separation aid lost by the removing of a part of the sludge by adding to the tank an amount of fresh separation aid corresponding to the amount of removed separation aid.

4. A method according to claim 1, further comprising the step of detecting the presence of an oil phase or a sludge phase in at least one position within the tank and according to the detection remove a certain amount of sludge before new contaminated oil is added to the tank.

5. A system for purification of contaminated oil, said system comprising a tank (3), wherein said tank comprises:
- at least one inlet (5) for providing contaminated oil and separation aid to the tank;
- at least one first outlet (7) for taking out purified oil from the tank after separation;
- at least one second outlet (9*a*, 9*b*) for taking out sludge comprising the separation aid together with the impurities from the oil after separation; and
- a mixer (13) arranged in the tank for mixing newly added contaminated oil with old sludge;
- a sludge removing device (21) connected to the at least one second outlet (9) and arranged for removing sludge from the tank (3);
- a separation aid adding device (23) connected to the at least one inlet (5) and arranged for adding a separation aid to the tank (3);
- at least one content detection sensor (25) arranged for detecting the presence of an oil phase or a sludge phase in at least one position within the tank; and
- a control device (27) connected to said at least one content detection sensor (25) and to said sludge removing device (21) for controlling the sludge removing device to remove a certain amount of sludge but not all the sludge from the tank (3) in dependence of the detection, said control device (27) further being connected to the separation aid adding device (23) and being arranged to control the separation aid adding device to add new separation aid in an amount corresponding to the amount of separation aid being removed from the tank in the removed sludge.

6. A system according to claim 5, comprising at least two second outlets (9*a*, 9*b*) provided at different levels in a bottom part (4) of the tank (3).

\* \* \* \* \*